United States Patent
Siegel

(10) Patent No.: US 9,342,995 B2
(45) Date of Patent: *May 17, 2016

(54) DOUBLE-SIDED, FRONT-TO-BACK-ALIGNED, TACTILE GRAPHIC LEARNING AID

(71) Applicant: Leslie Siegel, Wellington, FL (US)

(72) Inventor: Leslie Siegel, Wellington, FL (US)

(*) Notice: Subject to any disclaimer, the term of this patent is extended or adjusted under 35 U.S.C. 154(b) by 65 days.

This patent is subject to a terminal disclaimer.

(21) Appl. No.: 14/282,698

(22) Filed: May 20, 2014

(65) Prior Publication Data

US 2015/0371555 A1 Dec. 24, 2015

Related U.S. Application Data

(63) Continuation-in-part of application No. 13/205,260, filed on Aug. 8, 2011, now Pat. No. 8,851,894, which is a continuation-in-part of application No. 12/406,605, filed on Mar. 18, 2009, now Pat. No. 8,021,159.

(60) Provisional application No. 61/037,583, filed on Mar. 18, 2008.

(51) Int. Cl.
*G09B 21/00* (2006.01)
*G09B 19/02* (2006.01)
*A63F 1/04* (2006.01)

(52) U.S. Cl.
CPC .............. *G09B 19/02* (2013.01); *G09B 21/003* (2013.01); *A63F 2001/0433* (2013.01)

(58) Field of Classification Search
USPC ......... 434/112, 113, 156, 162, 164, 428, 430, 434/188, 191, 205; 40/584, 615, 616
See application file for complete search history.

(56) References Cited

U.S. PATENT DOCUMENTS

| | | | |
|---|---|---|---|
| D163,085 S * | 5/1951 | Bishop | 434/205 |
| 3,206,872 A * | 9/1965 | Nason | G09B 3/04 273/292 |
| 3,811,205 A | 5/1974 | Pitzler | |
| 3,874,096 A * | 4/1975 | Romstad | G09B 19/02 434/199 |
| 4,034,486 A | 7/1977 | Mills | |
| 4,770,638 A * | 9/1988 | Jabour | G09B 3/02 434/191 |
| 4,993,952 A | 2/1991 | Yeh | |
| 5,137,452 A | 8/1992 | Pollock | |
| 5,205,747 A | 4/1993 | Tan | |
| 6,062,864 A * | 5/2000 | Rood | G09B 19/02 434/12 |

(Continued)

*Primary Examiner* — Kurt Fernstrom
(74) *Attorney, Agent, or Firm* — H. John Rizvi; Gold & Rizvi, P.A.

(57) ABSTRACT

A double-sided, front-to-back aligned tactile learning aid is provided, which includes a substantially planar carrier medium with a protruding front tactile graphic aligned with and symmetrical to a protruding back tactile graphic. The carrier medium may be one, two, or more sheets of paper, plastic, or other generally planar material. The front graphic and the back graphic protrude from the front and back, respectively, of the carrier medium. At least a portion of the back tactile graphic is aligned with at least a portion of the front tactile graphic. The double-sided, front-to-back aligned tactile learning aid is clearly expressive of (and/or representational of) a physical structure, yet is embodied in a generally two-dimensional planar construction, so is easier to store. The double-sided, front-to-back aligned tactile learning aid may be used as a semi-concrete or demi-concrete aid for sighted and visually-impaired students.

17 Claims, 11 Drawing Sheets

(56) References Cited

U.S. PATENT DOCUMENTS

| | | |
|---|---|---|
| 6,375,468 B1 | 4/2002 | Sundararajan |
| 6,652,286 B1 * | 11/2003 | Larsen .................. G09B 19/02 353/27 R |
| 6,676,414 B1 * | 1/2004 | MacHendrie .......... G09B 19/02 273/302 |
| 7,077,655 B2 | 7/2006 | Watanabe |
| 7,080,982 B2 * | 7/2006 | Rawlins ................... G09B 3/00 434/156 |
| 7,771,200 B2 * | 8/2010 | Schultz ..................... A63F 1/04 473/188 |
| 2009/0061397 A1 * | 3/2009 | Treloar ..................... A63F 1/00 434/129 |

* cited by examiner

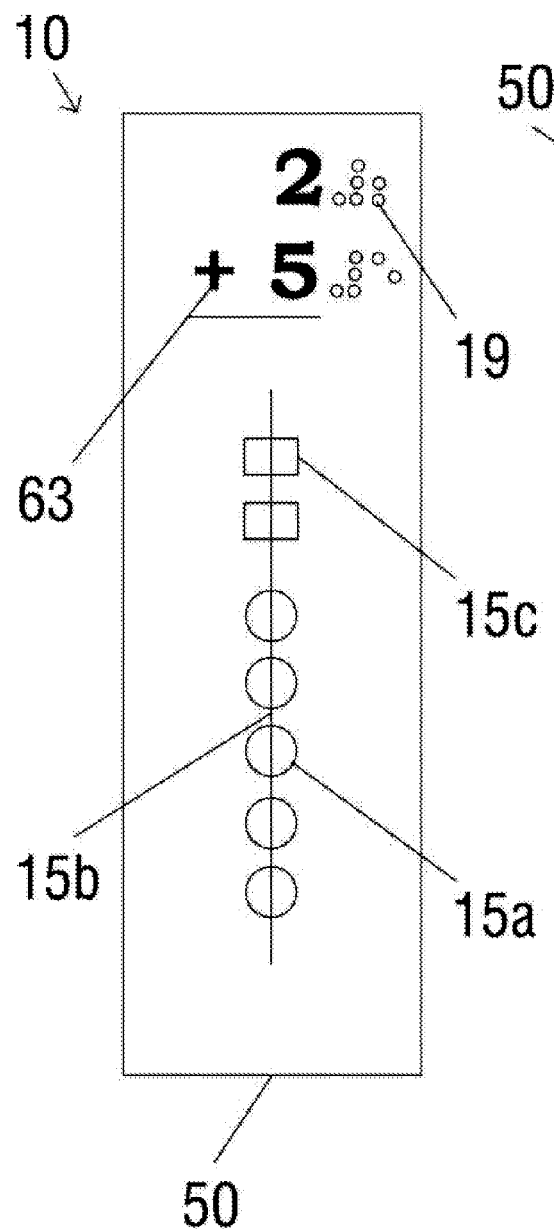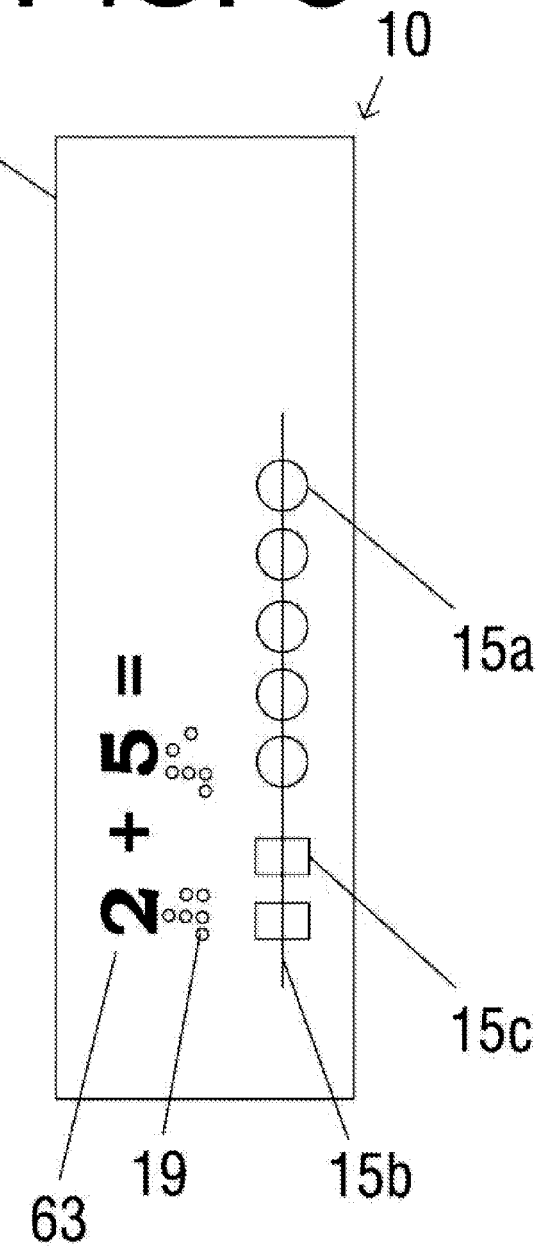

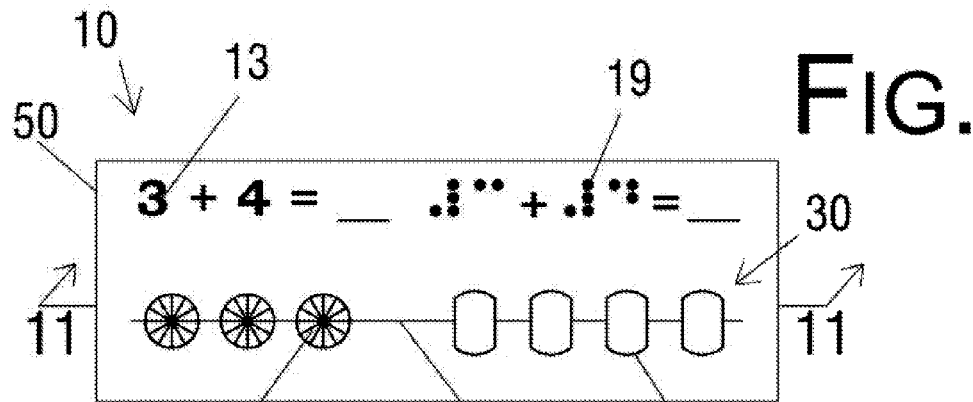
FIG. 9
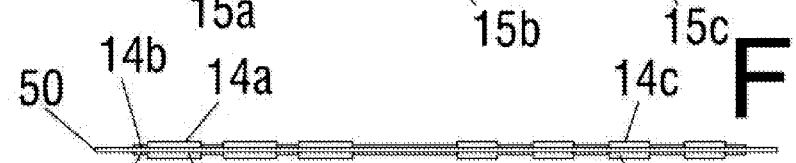
FIG. 10
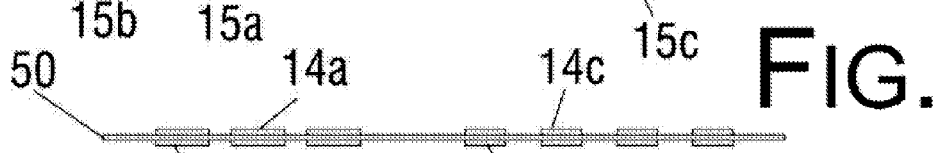
FIG. 11
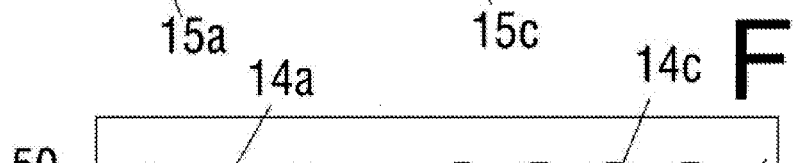
FIG. 12
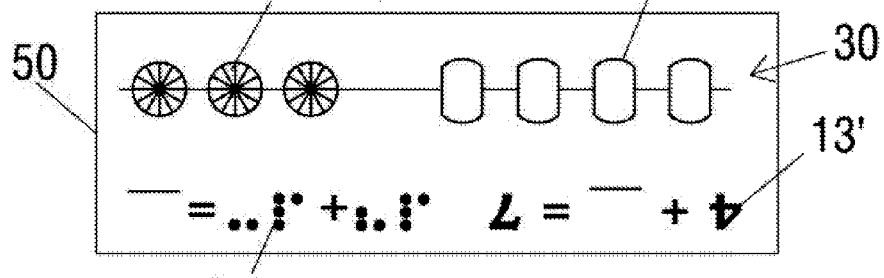
FIG. 13
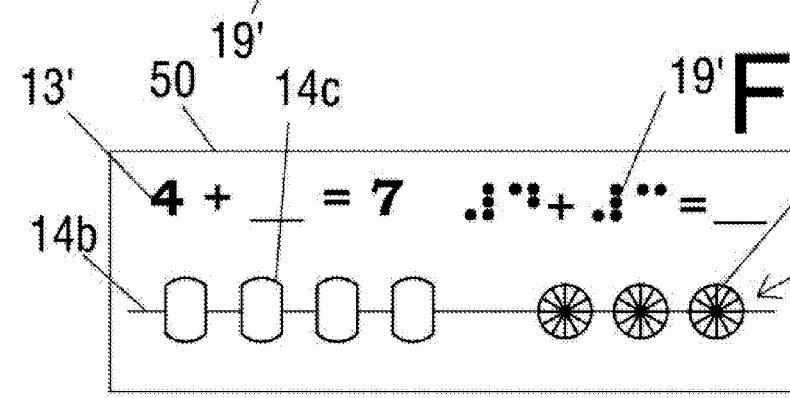

DOUBLE-SIDED, FRONT-TO-BACK-ALIGNED, TACTILE GRAPHIC LEARNING AID

CROSS-REFERENCE TO RELATED APPLICATIONS

This Continuation-In-Part Application claims the benefit of co-pending U.S. Non-Provisional patent application Ser. No. 13/205,260, filed on Aug. 8, 2011, which in turn is a Continuation-In-Part Application of U.S. Non-Provisional patent application Ser. No. 12/406,605, filed on Mar. 18, 2009 and granted on Sep. 20, 2011 as U.S. Pat. No. 8,021,159, which in turn claims the benefit of U.S. Provisional Patent Application Ser. No. 61/037,583, filed on Mar. 18, 2008, all of which are incorporated herein in their entirety.

FIELD OF THE INVENTION

The present invention relates generally to a teaching or learning aid, and more particularly, to a handheld, double-sided, tactile teaching or learning aid with front-to-back-aligned raised graphics.

BACKGROUND OF THE INVENTION

Teachers have found learning aids beneficial to introduce, teach, and reinforce concepts and facts in all subjects. Conventional learning aids are available in a myriad of types and kinds, from the traditional math fact flashcards to hands-on manipulative learning aids ("manipulatives"). It is well known by those skilled in the art that learning is promoted by beginning at a concrete level, such as with concrete manipulative objects, and then moving to an abstract level, such as using numerals on paper to represent the concrete objects.

Manipulatives are particularly effective in helping a student understand mathematic concepts, such as addition, subtraction, multiplication, division, geometry, etc. By providing a manipulative, the teacher can allow the student to move from the concrete experience of investigating the manipulative to the abstract concept being taught that is represented by numerals written on paper. These math manipulatives include, for example, interlocking units to form rods, colored rods of varying lengths, base ten blocks, abacus, and the like. However, not all students find it easy to move from the concrete to the abstract. For these students, certain strictly pictorial and two-dimensional learning aids are available (for example, a two-dimensional printed picture of a learning aid supplied to the student or a sketch by the student of a learning aid), in order to provide a bridge between the concrete and the abstract. However, these learning aids are limited in usability for sighted students and unusable for visually handicapped students.

It is a great challenge for teachers to teach blind and visually-impaired students to the same extent and potential as sighted students. Despite tactile learning aids for the blind are well known in the art, the number and types of learning aids that are available and suitable for visually-impaired students is unfortunately limited. The BANA Tactile Graphic Guidelines (the official North American reference jointly compiled under the authority of the Braille Authority of North America and the Canadian Braille Authority, L'autorité Canadienne Du Braille) lists single-sided tactile learning aids for visually-impaired students along with Braille learning aids.

It is also a challenge to teach students presenting Autism Spectrum Disorders (ASD). In this respect, it has been shown that students with ASD are more involved and learn more easily with learning aids that encompass using various senses. Thus, it would be advantageous to provide suitable tactile learning aids for students with ASD.

In general, learning aids must not only be effective in teaching mathematical or other applicable skills, but also must be easy to transport and store. For instance, while conventional three-dimensional manipulatives assist the student in learning, they are by their three-dimensional nature cumbersome to store, to maintain, to distribute to students, to collect from students, and to send home with students.

Accordingly, there is an established need for a learning aid that meets the need for a sturdy, easy-to-store, semi-concrete manipulative usable for teaching math and other subjects, while enhancing learning for sighted students, visually-impaired students, and students with ASD.

SUMMARY OF THE INVENTION

The present invention is directed to a double-sided, front-to-back aligned graphic learning aid, which includes a substantially planar carrier medium with a front tactile graphic protruding from the carrier medium front surface and a back tactile graphic protruding from the carrier medium back surface. At least a portion of the protrusion of the back tactile graphic is aligned with at least a portion of the protrusion of the front tactile graphic. When the fingers are run along the carrier medium the aligned front graphic and back graphic are felt simultaneously, expressing the concrete object. Non-tactile graphics or tactile, non-aligned graphics may be additionally included on the carrier medium to further instruction or for information. The present invention provides a semi-concrete or demi-concrete learning aid that efficiently and advantageously supplies a tactile bridge from the concrete to the abstract, and that can be used by virtually any student, including visually-impaired students. The learning aid of the current invention serves the purpose of a manipulative, yet is easier to store, maintain, distribute, collect, and transport.

The front-to-back aligned tactile learning aid is expressive of a three-dimensional physical structure, yet is embodied as raised protrusions on a generally two-dimensional planar construction, so that it is easier to store. The front-to-back aligned tactile learning aid may be used as a semi-concrete or demi-concrete manipulative to teach various subjects for sighted and visually-impaired students. Therefore, the student would typically learn with a manipulative object (such as three-dimensional unit blocks representing two plus five); then would progress to using the semi-concrete front-to-back aligned tactile learning aid of the present invention (with a front and back raised aligned graphic of two objects plus five objects touchable from the front and from the back simultaneously as the child runs the card between his fingers); lastly the student would progress to the abstract concept (such as numerals on paper representing the numbers, in this example "2+5").

Though the double-sided front-to-back aligned tactile learning aid is particularly shown as usable in a math manipulative, as herein particularly demonstrated, it is also advantageously usable to teach other subjects and lessons.

An object of the present invention is to provide a double-sided, front-to-back aligned tactile learning aid that has at least a portion of the protrusion of a back graphic aligned with at least a portion of the protrusion of a front graphic in a manner that both the front and the back of the aligned graphic can be felt by a student.

Another object of the present invention is to provide a double-sided, front-to-back aligned tactile learning aid that is generally planar, yet is expressive of, or representational of, a three-dimensional structure.

A further object of the present invention is to provide a double-sided, front-to-back aligned tactile learning aid that is easier to store than a corresponding three-dimensional structure.

An additional object of the present invention is to provide a double-sided, front-to-back aligned tactile learning aid that is adapted for teaching visually-impaired students.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 4 is a front schematic view illustrating a vertical representational double-sided, front-to-back aligned tactile learning aid of the present invention;

FIG. 5 is a front schematic view illustrating a horizontal representational double-sided, front-to-back aligned tactile learning aid of the present invention;

FIG. 9 shows a front view of the preferred embodiment of the double-sided, front-to-back aligned tactile learning aid of the present invention;

FIG. 10 shows a top edge view of the learning aid of FIG. 9 with the front of the card facing downward and the back of the card facing upward;

FIG. 11 shows a cut view of the learning aid of FIG. 9 taken along line 11-11;

FIG. 12 shows a back view of the learning aid of FIG. 9, with the learning aid of FIG. 9 flipped forward 180 degrees;

FIG. 13 shows a back view of the learning aid of FIG. 9, with the learning aid of FIG. 9 flipped forward 180 degrees and rotated 180 degrees clockwise;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
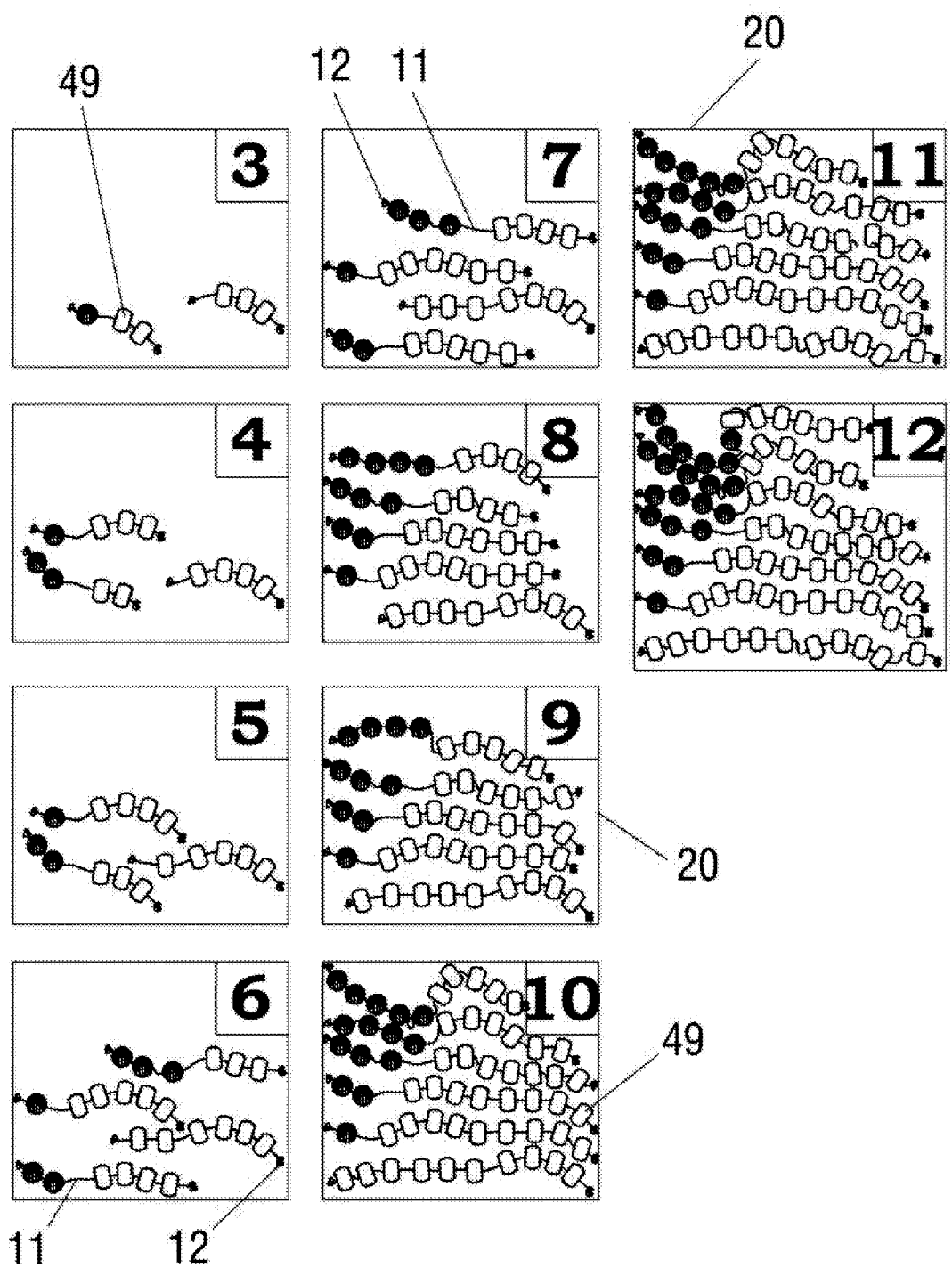
FIG. 1 is a top schematic view showing concrete objects of an addition/subtraction set comprising ten number family sub-sets of a string math manipulative system.

The illustration of FIG. 1 shows a new string math three-dimensional manipulative system, which provides a concrete learning aid for teaching addition and/or subtraction. By concrete, it is understood that the learning aid allows a student to physically interact with objects related to addition and subtraction operations. Specifically, the system is formed by a set of containers 20, each associated to a number between 3 and 12 (the number shown in the top right corner of the container 20). Each container 20 stores a set of strings 11 on which a plurality of holed objects 49 are threaded. The number of strings 11 stored in each container 20 and the number of holed objects 49 threaded on the strings 11 are directly dependent on the associated number corresponding to each container 20. Specifically, the number of strings 11 is equal to the number associated to the container 20 minus one, and the number of holed objects 49 on the strings 11 is equal to the number associated to the container 20. In addition, the holed objects 49 have a discriminating characteristic or variation, such as variations of colors, shapes, sizes, textures and/or materials. On each string 11, one or two discriminating characteristics or variations are used within one set of threaded holed objects 49 to represent the numerals of a math fact related to the number associated to the container 20; i.e., one or more holed objects 49 having a first discriminating characteristic are threaded on each string 11, with most strings 11 of the set having one or more holed objects 49 with a first discriminating characteristic and one or more holed objects with a second discriminating characteristic. Both ends of each string 11 terminate in a retaining mechanism 12 to retain the series of holed objects 49 on the string 11.

Figure 2:
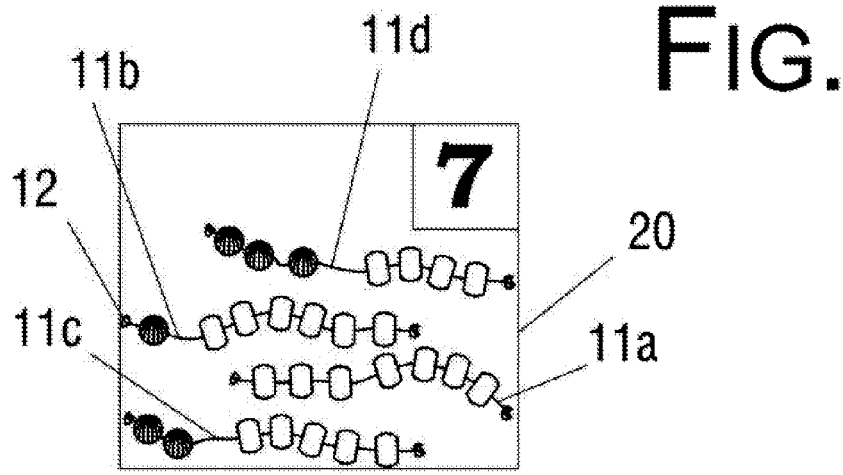
FIG. 2 is a top schematic view showing concrete objects of the sub-set of the number family of "7", of a string math manipulative system, which is suitable for representation by the double-sided, front-to-back aligned tactile learning aid of the present invention.
Figure 3:
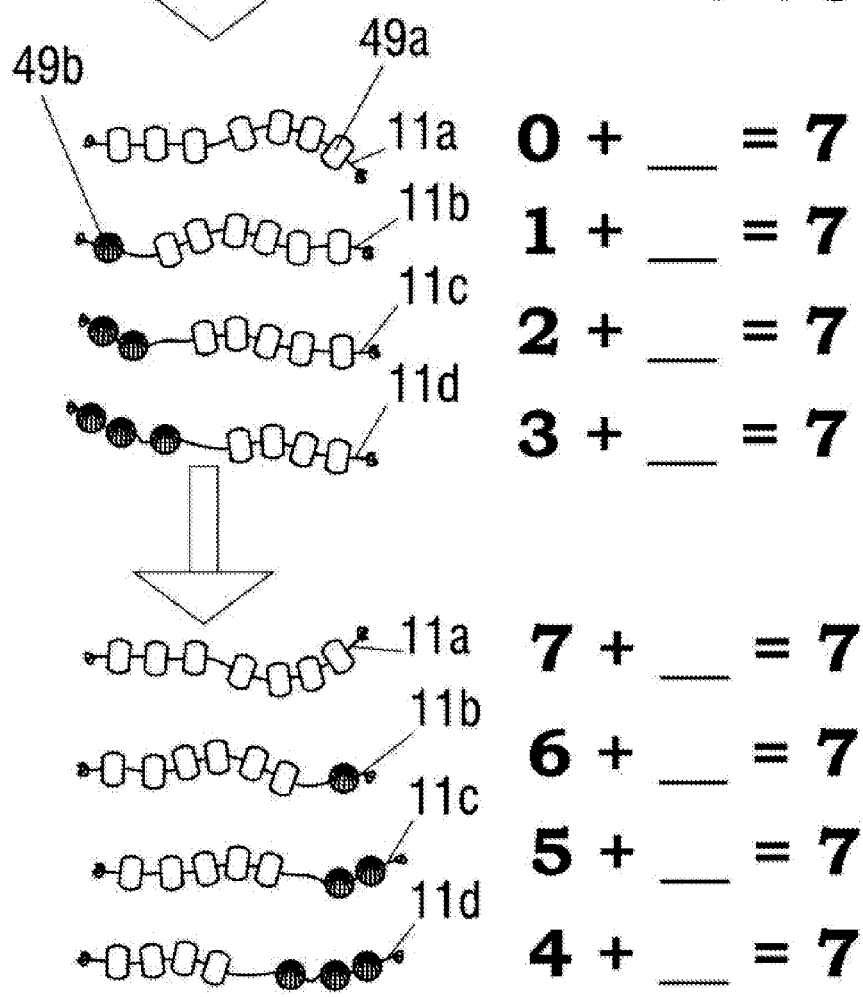
FIG. 3 is a top schematic view showing the method of teaching the number family of "7" of a string math manipulative system, which is suitable for representation by the double-sided, front-to-back aligned tactile learning aid of the present invention.

The illustrations of FIGS. 2 and 3 present a method of teaching addition math facts using the system of FIG. 1 and, in particular, to teach addition math facts related to number seven (7). The method is based on using the addition/subtraction set of strings 11a, 11b, 11c, 11d included in the container 20 marked with associated number "7". In order to carry out the method, the teacher extracts the strings 11a, 11b, 11c, 11d from the container 20, and successively hands the strings to the student. As shown, each string is threaded with seven holed objects. A first string 11a is threaded with seven first-variation holed objects 49a, having a first discriminating characteristic (for example, a first shape and a first color), representing math facts 7+0=7 and 0+7=7. A second string 11b is threaded with six first-variation holed objects 49a, and with one second-variation holed object 49b that has a second discriminating characteristic (for example, a second shape and/or a second color), representing math facts 6+1=7 and 1+6=7. A third string 11c is threaded with five first-variation holed objects 49a and with two second-variation holed objects 49b, representing math facts 5+2=7 and 2+5=7. A fourth string 11d is threaded with four first-variation holed objects 49a and with three second-variation holed objects 49b, representing math facts 4+3=7 and 3+4=7. Normally, the teacher hands the strings 11a, 11b, 11c, 11 d one at a time to the student, starting with the first string 11a and ordered by the increasing number of second-variation holed objects 49b. The student grabs each string, touches the holed objects 49a, 49b, feels or observes the different discriminating characteristics between the first-variation holed objects 49a and the second-variation holed objects 49b, counts the number of first-variation holed objects 49a and the number second-variation holed objects 49b, counts the total number of holed objects, and relates all counted numbers and different discriminating characteristics, physically mirroring the corresponding math operation and thus becoming familiarized with the corresponding math fact. In order to favor this learning process, the student can separate the first-variation holed objects 49a and second-variation holed objects 49b, pulling each subset to different ends of the string. Further, the student may hold the first-variation holed objects 49a in one hand and the second-variation holed objects 49b in the other hand. Also, the student may demonstrate and verbalize to him or herself, or to others, the addition of the first-variation holed objects 49a to the second-variation holed objects 49b. Thus, concrete, tactile learning takes place that helps the student internalize the math facts and understand the concept behind the facts, as opposed to only learning the math facts by rote memory.

To teach the remaining addition facts, the strings 11a, 11b, 11c, 11d are flipped over or rotated 180 degrees; thereby, for example, string 11d, which previously represented 3+4=7, will now represent 4+3=7. This also introduces the students to the commutative property of addition. Flipping the strings allows the student to see the total number of math facts to learn is less than the number of math facts when written out on paper. Therefore memorization feels finite and more manageable to the student, who now sees the math facts for the number family as a unit. Though for purposes of description smaller numbers have been used, optionally, larger numbers may also be used.

The pre-set organization of the holed objects 49 on strings 11 encourages learning, eliminating the seemingly un-relatedness or separateness of math facts. The math facts do not have to be memorized in isolation. This organized method helps the student to achieve mastery more quickly and to gain a better understanding of the concepts, advantageously resulting in less teaching time and less student anxiety.

The illustrations of FIGS. 4 through 25 present a second learning aid system that provides a bridge between the concrete math fact learning provided by the system of FIG. 1 and an abstract learning and understanding of math facts. This second learning aid system is based on substantially planar, double-sided flashcards having tactile aligned and symmetrical tactile graphics on both sides, as will be explained. The front and back tactile graphics combination is expressive of, and/or representational of a three-dimensional physical structure, wherein the three-dimensional physical structure is divided and presented to the student in two parts, one on each side of the planar carrier medium; thus, the student must exercise a certain degree of abstraction in order to imagine the represented three-dimensional structure.

Figure 6:
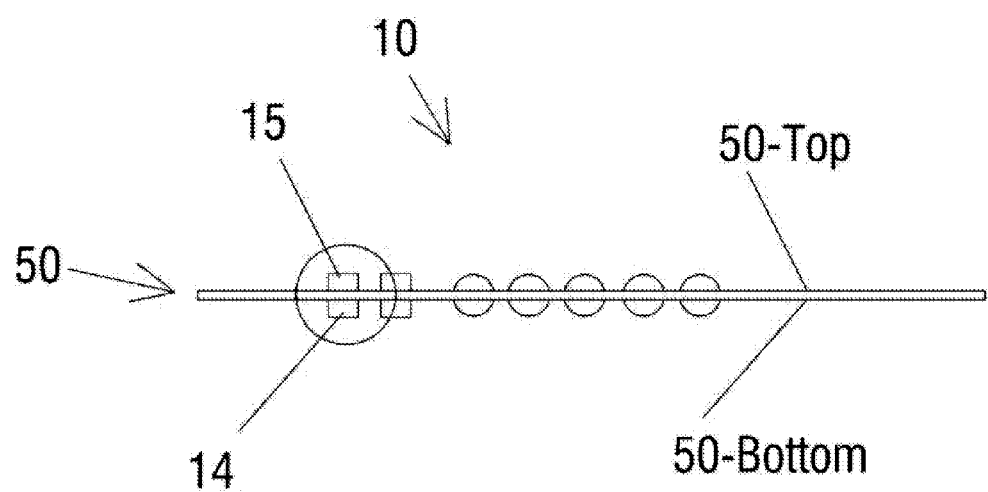
FIG. 6 is a top view illustrating the double-sided, front-to-back aligned tactile learning aid of FIG. 5.
Figure 7:
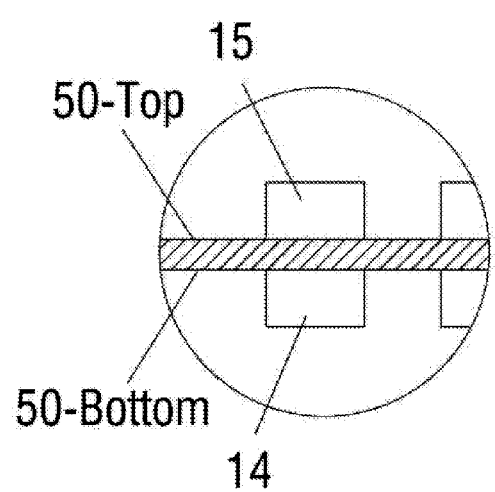
FIG. 7 is a detail view of a circled portion of FIG. 6, illustrating the double-sided, front-to-back aligned tactile learning aid of the present invention.

An exemplary flashcard or learning aid 10 is depicted in FIGS. 4, 6 and 7. A side view of the learning aid 10 is shown in FIG. 6. The learning aid 10 comprises a generally planar carrier medium 50, such as a paper or plastic card. As shown in the figure, the planar carrier medium 50 is provided with a front tactile graphic 15 and a back tactile graphic 14 arranged on opposite sides of a planar carrier medium 50 (the sides having been indicated as "50-Top" ad "50-Bottom"). In the present embodiment, as shown in the enlarged view FIG. 7, the front tactile graphic 15 and back tactile graphic 14 are symmetrical with respect to the planar carrier medium 50, providing an identical tactile sensation. Alternative embodiments are contemplated in which the front tactile graphic 15 and the back tactile graphic 14 are not symmetrical but are aligned. The present front tactile graphic 15 and back tactile graphic 14 are, specifically, a representation of the third string 11c of FIGS. 2 and 3. Turning to FIG. 4, it can be observed that the front tactile graphic 15 comprises front tactile graphics 15a representing the first-variation holed objects 49a, front tactile graphics 15c representing the second-variation holed objects 49b, and a front tactile graphic 15b representing the third string 11c onto which the holed objects 49a, 49b are threaded. The tactile graphics 15, 14 thus represent math facts 5+2=7 and 2+5=7.

Optionally, non-aligned tactile graphics can be included on the learning aid 10 to further enable usage of the learning aid 10. For instance, the present embodiment includes a Braille numeral math fact 19, related to the math fact of the tactile graphics 15, 14. In addition, the learning aid 10 can include visual graphics, such as Arabic numerals 63. For example, it might be desirable for students with limited vision and/or sighted students and/or teachers to have the math fact in numerals as an additional reference, optionally with color-coding.

A student that has practiced math facts 5+2=7 and 2+5=7 using the concrete learning aid third string 11c of FIG. 3 is then handed the semi-concrete (or demi-concrete) learning aid 10 of FIG. 4, for the student to continue practicing the math facts on a more abstract plane. The student holds the card or planar carrier medium 50, touches the front and back tactile graphics 15, 14, imagines the three-dimensional object formed by combining both tactile graphics 15, 14, and relates the imagined object with the associated math fact. Later, the math facts can be presented in numerals on paper. Thus the leap that was required to jump from the concrete objects to the abstract numerals is bridged by the intermediary semi-concrete front-to-back aligned tactile learning aid 10 of the present invention, which allows using not only the sense of sight, but also the sense of touch, thus enhancing learning. This semi-concrete learning bridge in accordance with the invention is valid for teaching both sighted and visually-impaired students, as well as special education students, learning-disabled students, physically-handicapped students, educable mentally-handicapped students and regular education students, including preschool students. Additionally, the double-sided, front-to-back aligned tactile learning aid 10 may be advantageously used with students with autism spectrum disorders (ASD). The multisensory learning aid 10 encourages a higher level of interaction for the student with ASD, increasing the student's engagement and involvement through the tactile experiences with the learning aid 10.

The learning aid of the present invention presents many significant advantages. For example, it is very convenient to store. A plurality of flashcards or learning aids 10 in accordance with invention can be conveniently stored in a box or holder, similar to flashcard storage. The reduction in storage space allows better utilization of limited classroom space. Additionally, the aligned learning aid 10 may be more easily sent home with children in a backpack for home study, because of its ease of transport and because it has no loose parts to lose. A further advantage is that the learning aid 10 will not roll off desks, and is not noisy to use. In addition, it does not lend itself to creative and imaginative play by students, so the students are less distracted and can remain on task longer. The learning aid is also very convenient to use, due to its substantially planar shape. In consequence, the time spent by teachers and students to set up, move, use, and return learning activities is reduced; in addition, a student might be able to conveniently review the double-sided raised image front-to-back aligned tactile learning aid 10 in a car or outside. The convenience of use of the aligned learning aids 10 promotes increased frequency of usage throughout the day. This increased frequency of exposure to the subject matter allows ready retention and assimilation by the student. Multiple, short periods of usage, such as twenty times per day, is permitted by the increased convenience of the learning aid 10, which is in direct contrast to the single, necessarily long period of usage for a physical manipulative, due to the large set-up/take-down time involved. In addition, the convenience of use allows increased efficiency in the usage of limited classroom learning time. Additionally, students can consistently use the aligned learning aid 10 independently and correctly after instruction by the teacher—thereby increasing valuable practice time. Further, the ease of distribution of the appropriate one or set of the aligned learning aid 10, allows the teacher to quickly individualize learning; each child can focus on the facts specific to their needs without the set-up time required for distributing and explaining an equivalent individualized learning center using physical objects. The use of the front-to-back aligned learning aid 10 of the present invention fosters frequent independent usage without needing direct teacher supervision, thus increasing learning. This reduction in time required by both teachers and students assures that the learning aid will be used more frequently in the classroom and in other settings.

Having the front tactile graphic arranged symmetrically to the back tactile graphic provides an extremely beneficial effect related to opposite operations, for example, addition and subtraction. For instance, in a learning aid such as that of FIG. 5, provided with a front string and symmetrical back string, the student reads the front string from left to right for addition and feels of the back string from right to left for subtraction. For example, the front of the card teaches 2+5=7, and the back of the card teaches 7−5=2.

Figure 8:
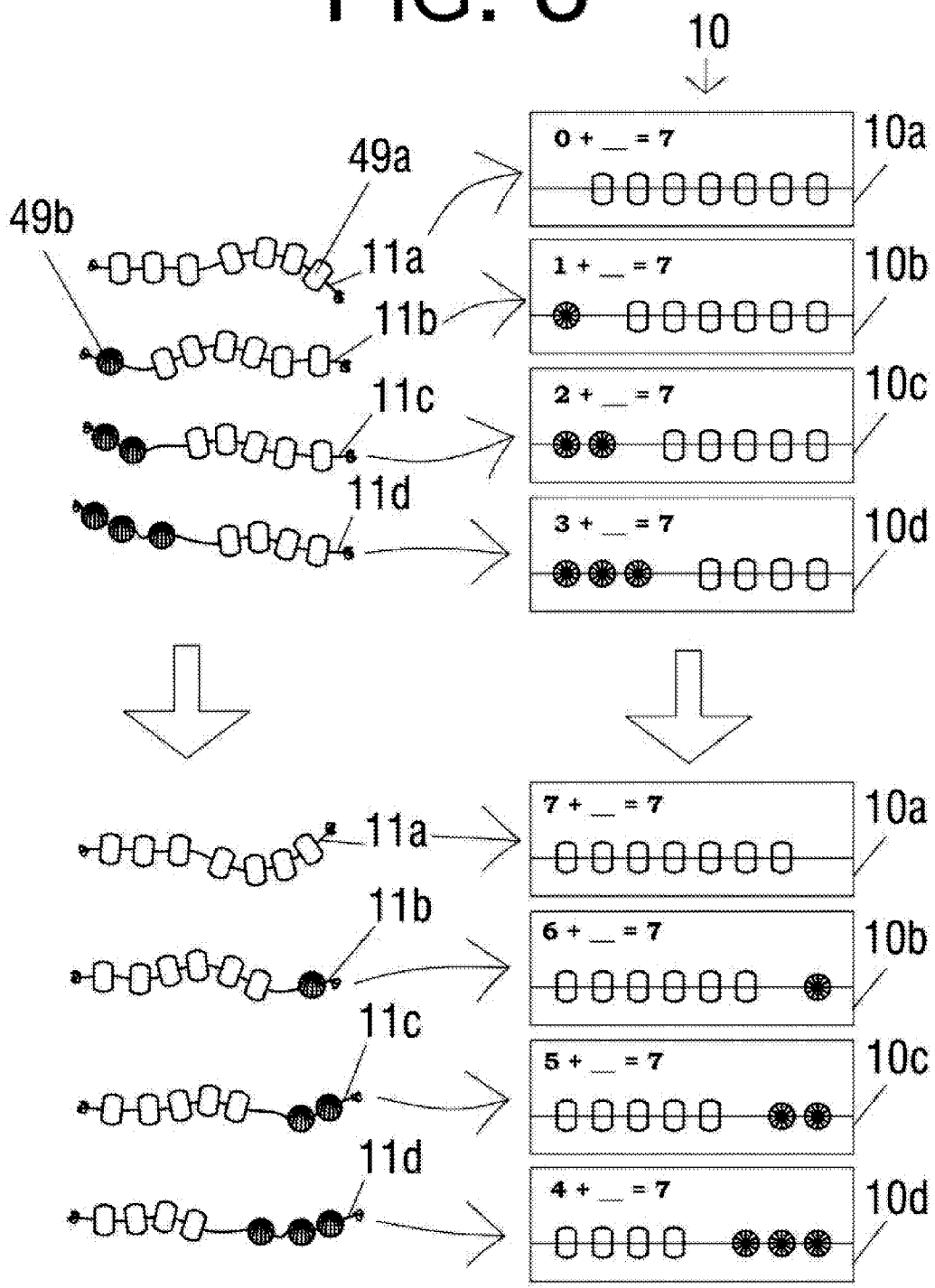
FIG. 8 is a front view showing the three-dimensional structure of an exemplary math manipulative set and a method of use, and a double-sided, front-to-back aligned tactile learning aid kit of the present invention which is clearly expressive of, and representational of, the three-dimensional structure.

Turning to FIG. 8, the full set of strings 11a, 11b, 11c, 11d is represented together with a corresponding learning aid 10 consisting of a set of learning aid flashcards 10a, 10b, 10c, 10d corresponding respectively to strings 11a, 11b, 11c, 11d. As shown, the strings comprising a variable number of first-variation holed objects 49a and second-variation holed objects 49b are represented as corresponding tactile graphics protruding from the learning aid flashcards 10a, 10b, 10c, 10d. Each learning aid flashcard 10a, 10b, 10c, 10d comprises a front side, a back side, a front tactile graphic disposed on and protruding from said front side, and a back tactile graphic disposed on and protruding from said back side, where the front tactile graphic comprises a plurality of first-variation graphics having a first discriminating characteristic (for instance, a round shape as shown in FIG. 8), and a plurality of second-variation graphics having a second discriminating characteristic (for example, a rectangular shape, as shown in FIG. 8). As in the previous embodiments, the back tactile graphic is aligned with and symmetrical to the front tactile graphic with respect to the flashcard 10a, 10b, 10c, 10d. In the present embodiment, each front tactile graphic in the plurality of flashcards 10a, 10b, 10c, 10d has the same number of total first-variation graphics (round graphics) and second-variation graphics (rectangular graphics) and a different number of first-variation graphics (round graphics); specifically, all flashcards 10a, 10b, 10c, 10d have seven round or rectangular graphics, where a first flashcard 10a has zero round graphics and seven rectangular graphics, a second flashcard 10b has one round graphic and six rectangular graphics, a third flashcard 10c has two round graphic and five rectangular graphics, and a fourth flashcard 10d has three round graphics and four rectangular graphics. The number and specific configuration of the plurality of first-variation graphics (round graphics) and of the plurality of second-variation graphics (rectangular graphics) of the front side of each flashcard 10a, 10b, 10c, 10d corresponds to and represents numerals in different addition math facts of a number family. For instance, in the embodiment shown, the number family is that of number seven (7); the absence of round graphics and presence of seven rectangular graphics in the first flashcard 10a represents math fact 0+7=7; the alignment of one round graphic and six subsequent rectangular graphics in the second flashcard 10b represents math fact 1+6=7; the alignment of two round graphics and five subsequent rectangular graphics in the third flashcard 10c represents math fact 2+5=7; the alignment of three round graphics and four subsequent rectangular graphics in the fourth flashcard 10d represents math fact 3+4=7.

It is contemplated that the discriminating characteristic or variation (or more than one discriminating characteristic or variation) that differentiates the first-variation graphics from the second-variation graphics can be, without limitation, a variation of color, shape, size, texture, outline, materials or a combination thereof.

As further shown in FIG. 8, each learning aid flashcard 10a, 10b, 10b, 10d can be flipped over in order to help the student understand the commutative property of the addition and subtraction math facts.

An alternative embodiment of the tactile learning aid 10 of the present invention is shown in FIGS. 9 through 13. Turning to FIGS. 9 and 10, a planar carrier medium 50 is shown having front tactile graphics 15a, 15b, 15c and symmetrical back tactile graphics 14a, 14b, 14c forming a joint tactile math fact representation that corresponds to math facts 3+4=7 and 4+3=7. In addition, if taken alone, the front tactile graphics 15a, 15b, 15c provide a visual and/or tactile representation 30 of math fact 3+4=7, as understood by FIG. 9. Similarly, as understood by FIG. 13, if taken alone, the back tactile graphics 14a, 14b, 14c provide a visual and/or tactile representation 30' of the math fact with the addends in the inverse order (4+3=7). As shown in FIG. 9, the front side of the carrier medium 50 of the present embodiment further includes a printed numeral math fact 13 and a corresponding Braille numeral math fact 19 arranged above the tactile math fact representation 30 of math fact 3+4=7. Optionally, if desired, the numeral math fact 13 may be tactile, preferably protruding from only a single side of carrier medium 50. In addition, as shown in FIG. 13, the back side of the carrier medium 50 comprises a printed numeral math fact 13' and a corresponding Braille numeral math fact 19' arranged above the tactile math fact representation 30' of the math fact with the addends in the inverse order (4+3=7). Thus, the student can not only use the learning aid 10 by jointly feeling the aligned front and back tactile graphics 15a, 15b, 15c, 14a, 14b, 14c, but can also use the learning aid 10 by observing or touching only the tactile graphics on one side of the carrier medium 50, together with the corresponding printed numeral math fact and Braille numeral math fact included on that side. The student can thus practice and learn the commutative property of additions by flipping the card over and studying each side separately, while also relating both sides. Furthermore, the student can learn the commutative property by flipping the card vertically. For instance, when the carrier medium 50 is placed in the position of FIG. 13, the back tactile graphics 14c, 14a present a tactile math fact representation 30' of math fact 4+3=7; if the carrier medium 50 is flipped over vertically to the position of FIG. 12, the same back tactile graphics 14a, 14c appear inverted and provide the math fact representation 30 of the math fact with the addends in the inverse order (3+4=7).

In addition, the tactile graphics of the present embodiment are formed with visual and/or tactile outlines (such as the visual outline of tactile graphic 15c), and textures (such as the radially-ridged texture of tactile graphic 15a). The tactile graphics can alternatively or complementarily be presented in one or more colors (for sighted students).

Figure 14:
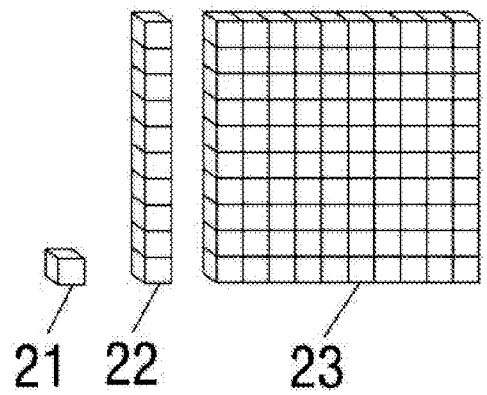
FIG. 14 shows three-dimensional unit blocks of the prior art.
Figure 15:
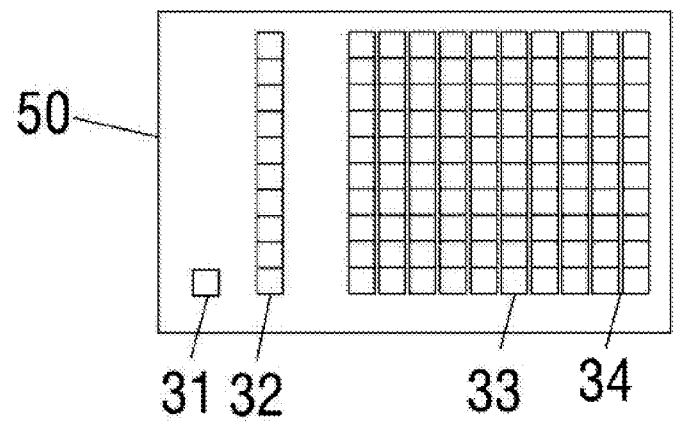
FIG. 15 shows a front view of an exemplary second embodiment of the double-sided, front-to-back aligned tactile learning aid of the present invention as a generally planar representation of the three-dimensional unit blocks of the prior art of FIG. 14.
Figure 16:
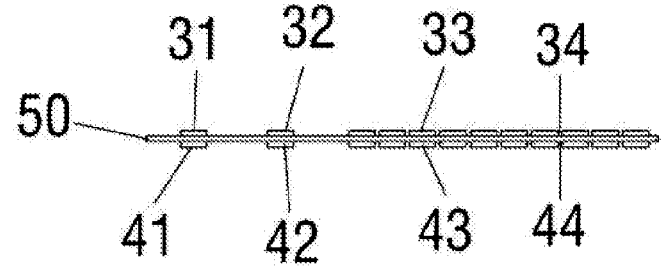
FIG. 16 shows a top view of the second embodiment of the double-sided, front-to-back aligned tactile learning aid of the present invention illustrating the alignment of the upper and lower protrusions.

The illustrations of FIGS. 15 through 16 depict a further embodiment of the double-sided, front-to-back aligned tactile learning aid 10 of the present invention that is useful in providing a semi-abstract learning aid complementing a conventional concrete learning aid of the kind illustrated in FIG. 14. The concrete learning aid known in prior art, as shown in FIG. 14, consists of a single-unit block set 21, a ten-unit block set 21, and a one-hundred-unit block set 23 for learning base 10 of the numbering system. The present embodiment illustrates that in particular situations some modifications or adjustments of the three-dimensional object may need to be made to adapt the three-dimensional object to the semi-concrete representation of the learning aid 10 of the present invention, while retaining the essence or meaning of the three-dimensional object. While the three-dimensional single-unit block set 21 and ten-unit block set 22 closely correspond to a generally two-dimensional single unit representation 31 and ten unit representation 32, the hundred unit representation 33 of prior art hundred-unit block set 23 is modified with interspersed depressions 34 or indentations. The depressions 34 (best shown in FIG. 16) facilitate the interpretation of the representation using the sense of touch. Thus modifications when progressing from the three-dimensional object to the generally two-dimensional, double-sided, front-to-back aligned tactile learning aid 10 are within the scope of the invention.

Figure 17:
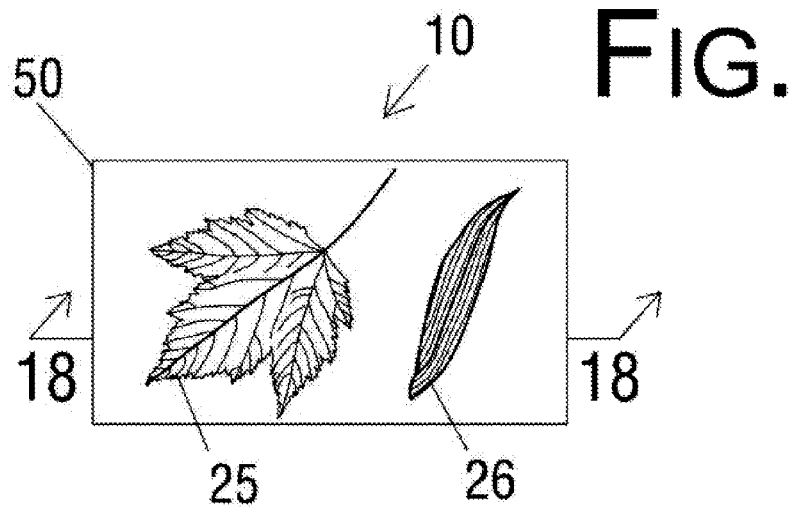
FIG. 17 shows a front view of a science-related third embodiment of the double-sided, front-to-back aligned tactile learning aid of the present invention.
Figure 18:
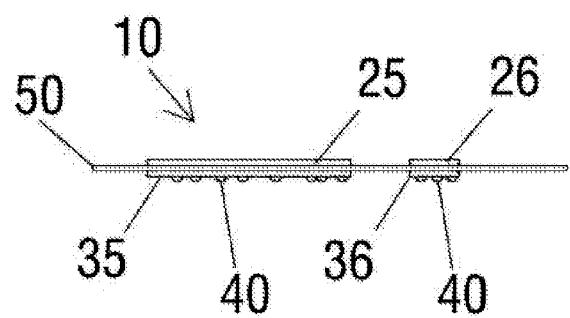
FIG. 18 shows a cut view, taken along line 18-18 of FIG. 17, of the science-related third embodiment of the double-sided, front-to-back aligned tactile learning aid of the present invention.

Representing another embodiment of the invention, FIGS. 17 and 18 illustrate the utilization of the double-sided, front-to-back aligned tactile learning aid 10 to teach science facts, such as the illustrated representation of leaves from monocot and dicot plants. Specifically, the leaning aid 10 shown in the figures consists of a planar front carrier medium 50 provided with front tactile graphics 25, 26 and back tactile graphics 35, 36 that are substantially aligned. In the present embodiment, the front tactile graphics 25, 26 are not symmetrical to the back tactile graphics 35, 36, as the veins 40 of the leaves are more pronounced (or only touchable) on the back tactile graphics 35, 36, as would be the veins of a typical leaf. Therefore, the student may touch the shape of the leaf (front tactile graphics 25, 26) and simultaneously touch the shape of the leaf with pronounced veins (back tactile graphics 35, 36 and leaf veins 40). The student can easily manipulate the learning aid 10 and can easily study and compare the vein structures of the two types of leaves. The learning aid 10 also provides advantages to the teacher. The learning aid 10 is sturdy, easy-to-store, convenient, long-lasting, and readily available for usage during all seasons, thus having advantages over three-dimensional natural leaves, yet being accurately representational.

Figure 19:
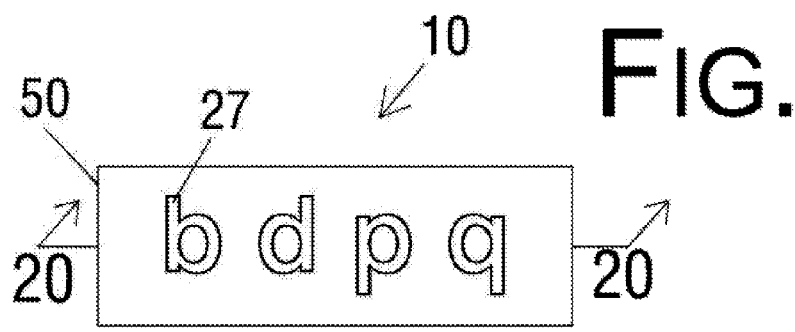
FIG. 19 shows a front view of a language arts-related fourth embodiment of the double-sided, front-to-back aligned tactile learning aid of the present invention.
Figure 20:
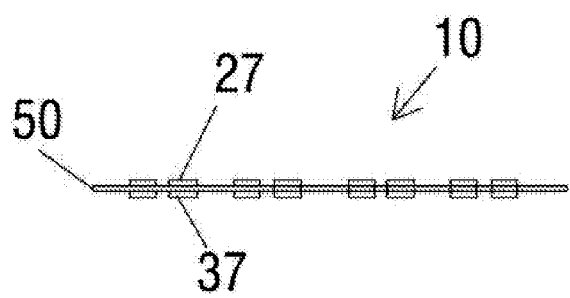
FIG. 20 shows a cut view, taken along line 20-20 of FIG. 19, of the language arts-related fourth embodiment of the double-sided, front-to-back aligned tactile learning aid of the present invention.

In turn, FIGS. 19 and 20 illustrate the utilization of the double-sided, front-to-back aligned tactile learning aid 10 to teach language art facts. For example, early readers often confuse the letters "b", "d", "p", and/or "q". The conventional printed letters on flash cards or paper are non-tactile. For some students (especially kinesthetic learners), it may be advantageous to touch and trace with the fingertips the aligned front tactile graphic 27 and the back tactile graphic 37, thus allowing the student to move beyond the conventional non-tactile printed letter to a semi-concrete representation of the letter structure provided by the double-sided, front-to-back aligned tactile learning aid 10 of the present invention. The added front-to-back aligned tactile aspect built on the traditional flash card or teaching aid concepts stimulates unexplored learning paths.

Figure 21:
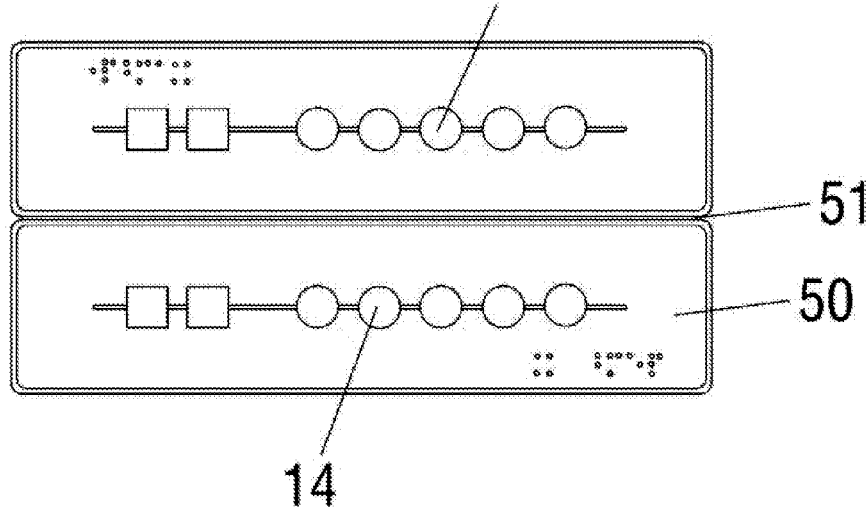
FIG. 21 shows a top view of an additional embodiment of the double-sided, front-to-back aligned tactile learning aid of the present invention, which is integrally molded, then folded in a manner that allows a protrusion on the back surface to align with a protrusion on the front surface.
Figure 22:
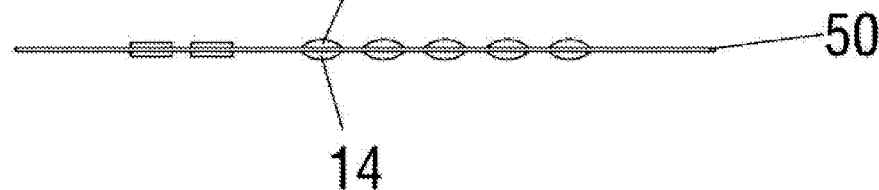
FIG. 22 shows a side view of the folded double-sided, front-to-back aligned tactile learning aid of the present invention of FIG. 21.

The illustrations of FIGS. 21 and 22 show a further embodiment of a learning aid 10 in accordance with the invention. The learning aid 10 unitarily molded of a plastic resin and folded along fold line 51. When folded, the front tactile graphic 15 aligns with the back tactile graphic 14. An adhesive (or other adhering means) may be used to permanently secure the learning aid in the folded position. As seen in FIG. 22, to enhance the tactile experience for the student, the protruding graphic of one shape may differ from another shape. In this example, the square protruding graphic is formed with sharp angles (emulating the right angles of the top of a square) while the circular protruding graphic is rounded (emulating the rounded feel of the top of a circle). Optionally, the front-to-back aligned tactile learning aid 10 can be formed molded in a single piece with the front and back protrusions formed unitarily with the carrier medium 50.

Figure 23:
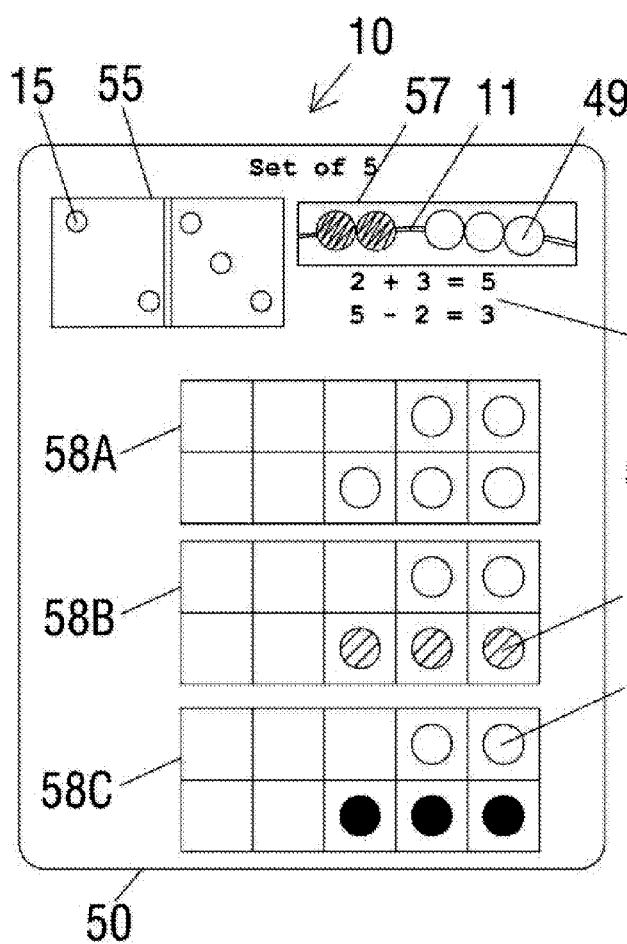
FIGS. 23-25 show the double-sided, front-to-back aligned tactile learning aid of the present invention incorporating one or more domino representations.
Figure 24:
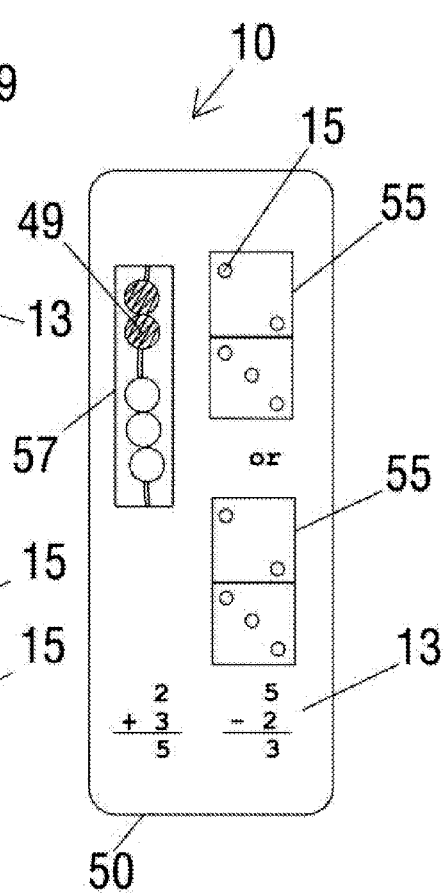

A further application of the present invention is shown in FIGS. 23 and 24, related to the game of domino, which may be commonly used for teaching mathematical concepts. As shown in FIG. 23, a learning aid 10 is provided with carrier medium 50 having a picture 57 of a string 11 with threaded holed objects 49 forming a math factor of 2+3=5. Printed numeral math facts 13 related to the string holed objects 49 are provided below the picture 57. In addition, the learning aid 10 includes a domino graphic 55 and three chart graphics 58A, 58B, 58C. The chart graphics of the present embodiment are two-dimensional representations of a domino card having ten frames arranged in two five-frame rows, and having a specific number of dots arranged in the frames in correspondence with the domino card; in particular, the dots of the present embodiment are carried out as front tactile graphics 15 having different textures as indicated by the various shadings. Thus the student sees the picture of the physical objects (holed objects 49) and correlates the printed numeral math facts 13, the domino graphic 55, and the chart graphics 58A, 58B, 58C. Both the domino graphic 55 and the chart graphics 58A, 58B, 58C may be the front-to-back aligned tactile graphics of the present invention. Similarly, in FIG. 24, domino graphics 55, a picture 57 of a string 11 with holed objects 49, and numeral math facts 13 are placed on a learning aid 10. The dots of the domino graphics 55 as well as the edges of the domino graphics 55 may protrude from both the top and bottom of the learning aid 10, forming a front-to-back aligned domino graphic. The front-to-back aligned, tactile domino graphic is a semi-abstract representation of a domino, yet provides greater ease of storage and handling than a physical domino. The additional opportunity to provide both a front and back alignment of the domino dots allows new interactions beyond a traditional one-sided domino.

In alternative embodiments, the learning aid 10 can comprise front and back aligned tactile graphics representing a framed chart similar to the chart graphics 58A, 58B, 58C, but having a variable number of frames, such as five frames, ten frames or other applicable number of frames, and a variable number of dots (or other graphic element) in each frame. In addition, the frames can be arranged in a variable number of rows and columns, including a single row and/or column. The dots (or other graphic element) and/or frame can be presented in monochrome, grayscale or colors, in different shapes, in different textures, or any combination thereof; for instance, color codes can be used so that the dots arranged in the frames reflect a certain math fact. For example, a learning aid can be provided with front-to-back aligned ten-frame arrays, each having two rows of five frames, one row having three empty frames and two frames containing a respective soft (compressible) square yellow dot, and the other row having two empty frames and three frames containing a respective hard (non-compressible) round blue dot, to illustrate math fact 2+3=5.

Figure 25:
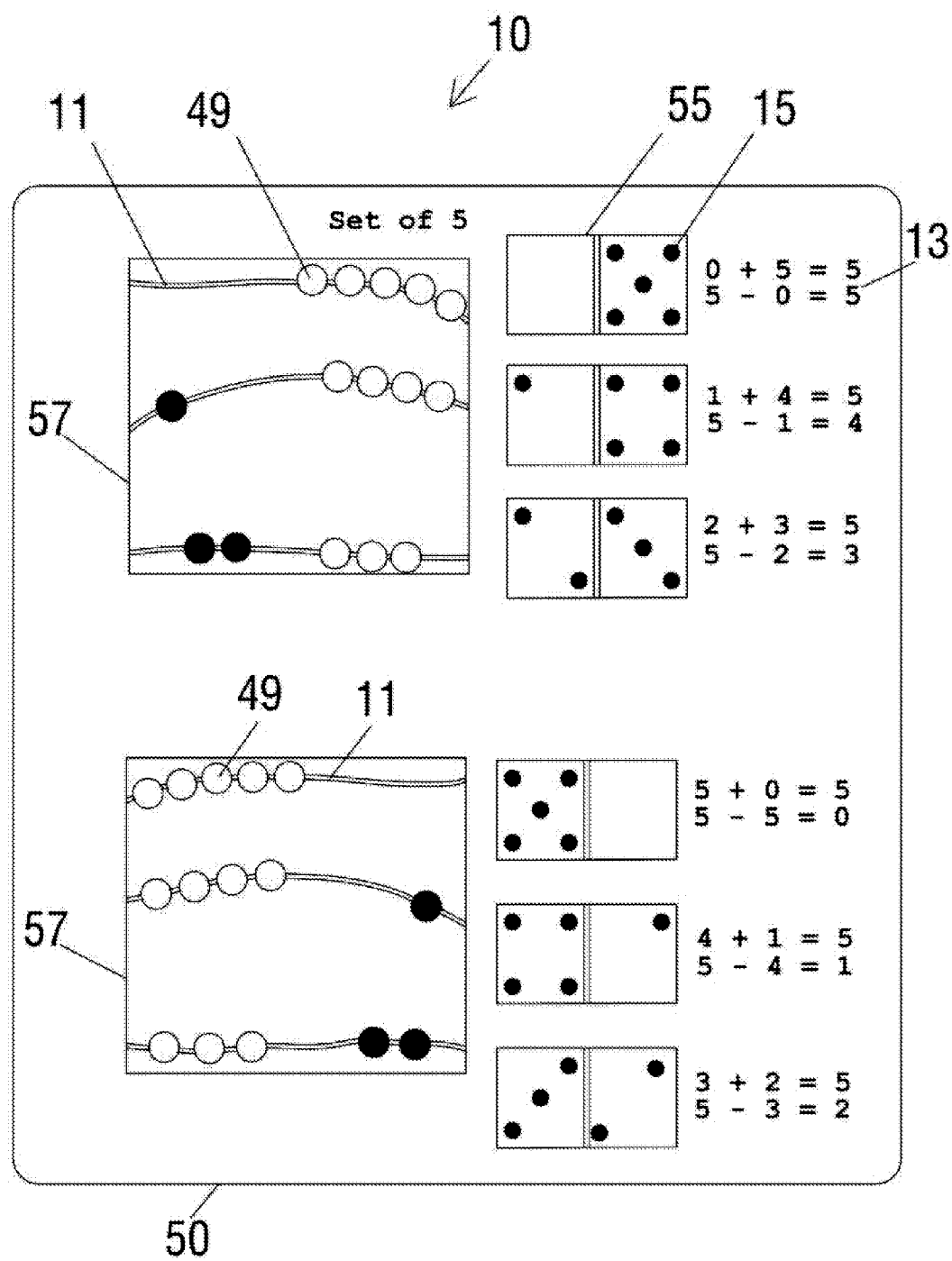

The illustration of FIG. 25 shows a further embodiment of the invention, consisting in a learning aid 10 incorporating a top picture 57 of several strings 11 and holed objects 49 representing a set of math facts, together with corresponding printed numeral math facts 13 and front-to-back aligned tactile domino graphics 55. Optionally, as shown in the drawing, a second picture 57 may be included showing the strings 11 with holed objects 49 flipped to represent corresponding inverted numeral math facts 13.

The learning aid 10 can include additional elements apart from the aligned front and back tactile graphics 15, 14. For instance, the learning aid may include a single-sided, non-aligned raised graphic or a flat printed graphic (such as the non-tactile printed numeral math fact 13 of FIGS. 23 through 25), as necessary to assist the student or teacher. The tactile learning aid 10 may also include raised Arabic numerals (including associated math symbols) and/or raised Braille numerals for visually handicapped students. A logo or raised pattern may be imprinted to orient the student to the top and bottom of the card, if desired (not shown in the figures). Optionally, a top corner may be cropped (not shown) to allow a visually-impaired student to quickly turn the card upright and to allow all students to easily align a set of cards.

The flashcards or learning aids of the present invention can be manufactured using various materials such as paper, plastic, leather, cork, rubber, foam or other applicable material or combination thereof. Other less preferable materials could be ceramic, metal, glass, wood, or combinations thereof. The carrier medium and tactile graphics may be manufactured by any method that is known, or becomes known, in the art; for instance, various methods of manufacture are presently envisaged, such as, but not limited to: injection molding (including injection molding of various materials, such as bi-material injection molding); embossing; debossing; hydroform embossing; three-dimensional printing; thermoforming; vacuum molding; stamping; compression molding; polydomes; paper swelling; gel application; photo-etching. The learning aids can be computer generated, machine generated or handmade. The carrier medium and tactile graphics preferably form a single, integral unit. If not forming a single integral unit, tactile graphics or images may be placed on the carrier medium by any fastening or adhering method that is known or will be known in the art, such as an adhesive. The carrier medium can be formed of one or more layers or sheets of material. It can also be manufactured as a foldable structure, as has been described herein. Optionally, color can be printed on the carrier medium and/or tactile graphics.

The learning aid comprising a planar carrier medium provided with aligned front and back tactile graphics is particularly adapted for teaching mathematics, as it serves to create a semi-concrete bridge between concrete three-dimensional manipulatives and abstract representational numerals on paper. However, it is contemplated that the learning aid is applied for teaching any of a variety of subjects, by varying and adapting the tactile graphics accordingly. For instance, the tactile graphics may include text (alphabetical and/or numerical), images, signs, icons, symbols, objects, geometrical figures (including shapes and types of angles), Braille, charts, fractions (such as pie charts or pieces of an object), measuring units, mathematic explanations and conceptualizations, games (such as card games or matching games), visualization of arrays, and the like.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A learning aid, comprising:
   a plurality of substantially planar carrier mediums, each carrier medium comprising:
   a front side;
   a back side;
   a front tactile graphic disposed on and protruding from said front side, said front tactile graphic comprising a plurality of first-variation graphics having a first discriminating characteristic, and a plurality of second-variation graphics having a second discriminating characteristic, and
   a back tactile graphic disposed on and protruding from said back side, wherein said back tactile graphic is aligned with and symmetrical to said front tactile graphic with respect to the carrier medium; wherein
   each front tactile graphic in said plurality of substantially planar carrier mediums has the same number of total first-variation graphics and second-variation graphics and a different number of first-variation graphics; and wherein
   the number and specific configuration of said plurality of first-variation graphics and of said plurality of second-variation graphics of said plurality of carrier medium front sides correspond to and represent numerals in different addition or subtraction math facts of a number family.

2. The learning aid of claim 1, wherein at least a portion of said back tactile graphic and/or front tactile graphic comprises a beads-on-a-string graphic.

3. The learning aid of claim 1, further comprising an additional tactile graphic protruding from the front side and/or the back side of said each carrier medium.

4. The learning aid of claim 1, further comprising Braille printed on at least one of said front side and said back side of said each carrier medium.

5. The learning aid of claim 1, further comprising a non-tactile graphic on the front side and/or the back side of said each carrier medium.

6. The learning aid of claim 1, wherein at least one carrier medium comprises a numeral math fact on the carrier medium front side, said front side math fact presenting addendums in a first order in correspondence with the number and specific configuration of said plurality of first-variation graphics and of said plurality of second-variation graphics of said front side, and a numeral math fact on the carrier medium back side, said back side math fact presenting the addendums of the front side math fact in a second order that is inverse to said first order.

7. The learning aid of claim 1, wherein at least one carrier medium comprises a Braille math fact on the carrier medium front side, said front side math fact presenting addendums in a first order in correspondence with the number and specific configuration of said plurality of first-variation graphics and of said plurality of second-variation graphics of said front side, and a Braille math fact on the carrier medium back side, said back side math fact presenting the addendums of the front side math fact in a second order that is inverse to said first order.

8. A handheld learning aid, comprising:
   a plurality of substantially planar carrier mediums, each carrier medium comprising:
   a front side;
   a back side;
   a front tactile graphic disposed on and protruding from said front side, said front tactile graphic comprising a plurality of first-variation graphics having a first discriminating characteristic, and a plurality of second-variation graphics having a second discriminating characteristic, and
   a back tactile graphic disposed on and protruding from said back side, wherein said back tactile graphic is aligned with and symmetrical to said front tactile graphic with respect to the carrier medium; wherein
   each front tactile graphic in said plurality of substantially planar carrier mediums has the same number of total first-variation graphics and second-variation graphics and a different number of first-variation graphics; and wherein
   the number and specific configuration of said plurality of first-variation graphics and of said plurality of second-variation graphics of said plurality of carrier medium front sides correspond to and represent numerals in different addition or subtraction math facts of a number family.

9. The handheld learning aid of claim 8, wherein at least a portion of said back tactile graphic and/or front tactile graphic comprises a beads-on-a-string graphic.

10. The handheld learning aid of claim 8, further comprising an additional tactile graphic protruding from the front side and/or the back side of said each carrier medium.

11. The handheld learning aid of claim 8, further comprising Braille printed on at least one of said front side and said back side of said each carrier medium.

12. The handheld learning aid of claim 8, further comprising a non-tactile graphic on the front side and/or the back side of said each carrier medium.

13. The handheld learning aid of claim 8, wherein at least one carrier medium comprises a numeral math fact on the carrier medium front side, said front side math fact presenting addendums in a first order in correspondence with the number and specific configuration of said plurality of first-variation graphics and of said plurality of second-variation graphics of said front side, and a numeral math fact on the carrier medium back side, said back side math fact presenting the addendums of the front side math fact in a second order that is inverse to said first order.

14. The handheld learning aid of claim 8, wherein at least one carrier medium comprises a Braille math fact on the carrier medium front side, said front side math fact presenting addendums in a first order in correspondence with the number and specific configuration of said plurality of first-variation graphics and of said plurality of second-variation graphics of said front side, and a Braille math fact on the carrier medium back side, said back side math fact presenting the addendums of the front side math fact in a second order that is inverse to said first order.

15. A flashcard learning aid kit, comprising:
   a plurality of substantially planar carrier mediums, each carrier medium comprising:
   a front side;
   a back side;
   a front tactile graphic disposed on and protruding from said front side, said front tactile graphic comprising a plurality of first-variation graphics having a first discriminating characteristic, and a plurality of second-variation graphics having a second discriminating characteristic, and
   a back tactile graphic disposed on and protruding from said back side, wherein said back tactile graphic is aligned with and symmetrical to said front tactile graphic with respect to the carrier medium; wherein
   each front tactile graphic in said plurality of substantially planar carrier mediums has the same number of total first-variation graphics and second-variation graphics and a different number of first-variation graphics; and wherein the number and specific configuration of said plurality of first-variation graphics and of said plurality of second-variation graphics of said plurality of carrier medium front sides correspond to and represent numerals in different addition or subtraction math facts of a number family.

16. The flashcard learning aid kit of claim 15, wherein at least one carrier medium comprises a numeral math fact on the carrier medium front side, said front side math fact presenting addendums in a first order in correspondence with the number and specific configuration of said plurality of first-variation graphics and of said plurality of second-variation graphics of said front side, and a numeral math fact on the carrier medium back side, said back side math fact presenting the addendums of the front side math fact in a second order that is inverse to said first order.

17. The flashcard learning aid kit of claim 15, wherein at least one carrier medium comprises a Braille math fact on the carrier medium front side, said front side math fact presenting addendums in a first order in correspondence with the number and specific configuration of said plurality of first-variation graphics and of said plurality of second-variation graphics of said front side, and a Braille math fact on the carrier medium back side, said back side math fact presenting the addendums of the front side math fact in a second order that is inverse to said first order.

* * * * *